(No Model.)

C. LEWY.
GLASS TILE.

No. 510,644. Patented Dec. 12, 1893.

Witnesses:
E. Kayser
Carl Rossbach

Inventor:
Carl Lewy
by:
Robert Fowler
Attorney.

UNITED STATES PATENT OFFICE.

CARL LEWY, OF CHARLOTTENBURG, NEAR BERLIN, GERMANY.

GLASS TILE.

SPECIFICATION forming part of Letters Patent No. 510,644, dated December 12, 1893.

Application filed August 8, 1892. Serial No. 442,451. (No model.)

*To all whom it may concern:*

Be it known that I, CARL LEWY, a subject of the King of Prussia, German Emperor, and a resident of Charlottenburg, near Berlin, in the Kingdom of Prussia, German Empire, have invented some new and useful Improvements in Glass Tiles for Ceiling or Wall Facings, of which the following is an exact specification.

The object of my invention is to provide means for firmly securing smooth glass plates to walls and ceilings, which plates hitherto could not be fixed directly to the latter by means of plaster of paris, cement or mortar.

My invention consists, therefore, in affixing to the back sides of said smooth glass plates irregular pieces of glass or any other suitable hard material. The plates, when prepared in such manner, can be readily and firmly secured to walls and ceilings by means of plaster of paris, cement, or any suitable mortar.

My invention will be more readily understood by reference to the accompanying drawings, in which—

Figure 1:
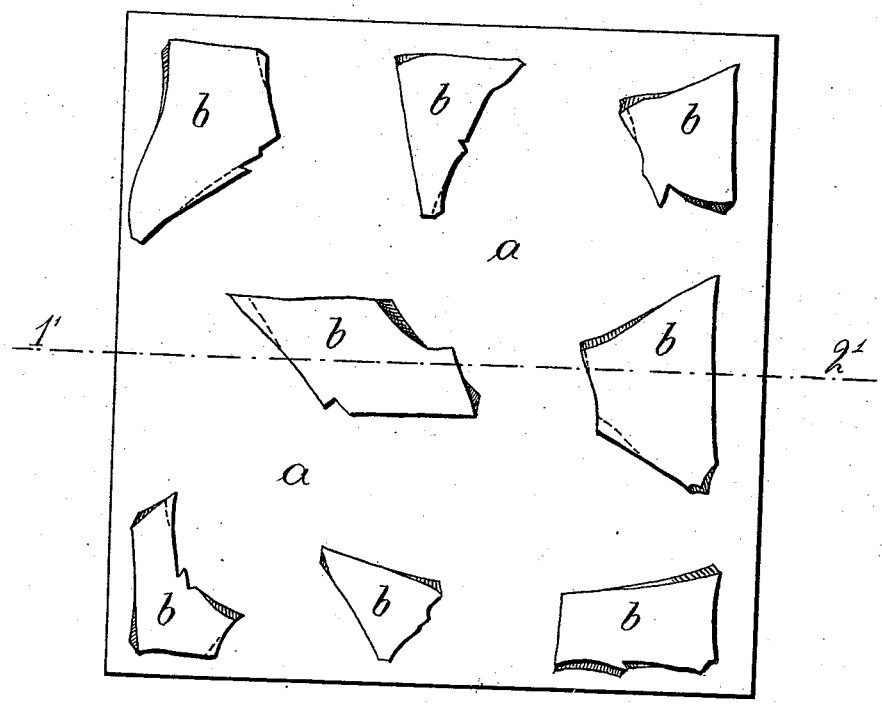
Figure 2:
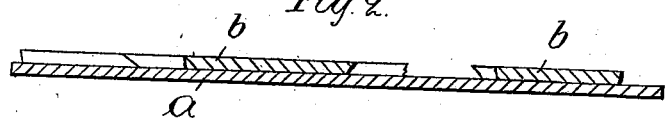

Figure 1 is a rear elevation of a smooth glass plate having pieces of hard material affixed to its back side, according to my improved method. Fig. 2 is a sectional elevation of the same, drawn on the line 1'—2' of Fig. 1.

Similar letters denote similar parts in both views.

To the back of the smooth glass plate $a$ there are secured in any manner a number of irregularly shaped pieces of hard material, preferably glass, as shown at $b$. These pieces must be plane on one side at least, and this plane place is in contact with the glass plate. As a rule, I prefer to employ plane pieces of broken glass, and the edges of these pieces will be most suited for the result sought to attain, if they are provided with irregular indents, as shown in Fig. 1, and if they are inclined at various angles to the back of the glass plate $a$, as will be seen on the drawings, and especially at Fig. 2. As a rule I secure the pieces $b$ by means of any suitable flux, preferably a glass-flux, so that, when heating the plate in a muffle, the said pieces become strongly united to the plate. The plate $a$, when prepared in the described manner, may be secured to the wall or the ceiling by means of plaster of paris, cement or mortar. This adhesive substance fills the indents of the pieces $b$ fixed to the back of the glass plate $a$, and, as it indurates, sticks very strongly to the said pieces. The glass plate $a$ is thus firmly secured to the wall or ceiling and cannot be disengaged from the latter unless it is broken to pieces.

What I claim, and desire to secure by Letters Patent of the United States, is—

A glass tile composed of a glass plate with broken pieces of glass spaced apart upon one side of the plate and welded thereto, the spaces and broken edges of the adhering pieces being adapted to interlock with the embedding mortar or cement, substantially as described.

In testimony whereof I have signed this specification in the presence of two subscribing witnesses.

CARL LEWY.

Witnesses:
 FR. SPERLING,
 W. HAUPT.